P. KAVANAGH.
Sheaves.

No. 141,564.

Patented August 5, 1873.

Witnesses.
E. H. Johnson
J. P. Cranford

Inventor.
Patrick Kavanagh

UNITED STATES PATENT OFFICE.

PATRICK KAVANAGH, OF CANARSIE, NEW YORK.

IMPROVEMENT IN SHEAVES.

Specification forming part of Letters Patent No. 141,564, dated August 5, 1873; application filed May 22, 1873.

*To all whom it may concern:*

Be it known that I, PATRICK KAVANAGH, of Canarsie, Kings county, New York, have invented an Improved Sheave, of which the following is a specification:

My invention relates to sheaves used in pulley-blocks, &c.; and consists in the novel construction and arrangement of parts which have for their object to greatly improve said sheaves and render the same more durable, as will be fully set forth hereafter.

Figure 1:
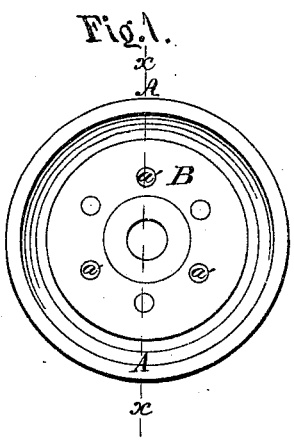
Figure 2:
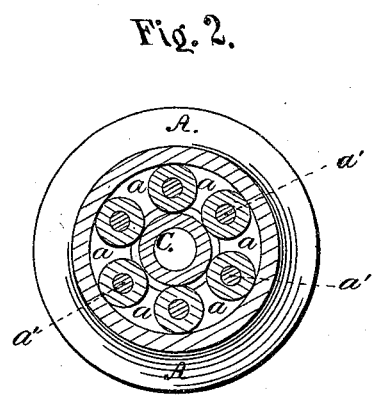
Figure 4:
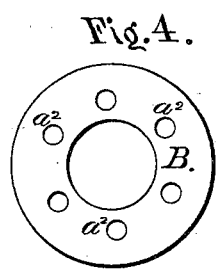
Figure 3:
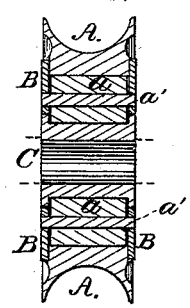
Figure 5:

Figure 1 represents a side elevation; Fig. 2, a vertical section in a plane at right angles to the axis of the sheave. Fig. 3 represents a section through the line $xx$, Fig. 1; and Figs. 4 and 5 represent parts in detail.

The improvement herein specified is designed to be used in sheaves provided with small rollers arranged around the pin on which said sheave turns, the office of these rollers being to obviate the friction which would be caused did the sheave turn directly on the pin. In all sheaves of this class constructed the friction-rollers were pivoted between two rings and ran in a groove cut in the central bore of the sheave, the flanges of the groove keeping them in place, and the pin on which the sheave revolved passed through the hole formed by the series of rollers. This arrangement rapidly wore away the parts, first by reducing the upper portion of the pin, the outside of which, in turn, wore away the rings, in some instances cutting away the metal so as to allow the rollers to fall out; and these rings, being in the same plane with the flanges of the groove in which the roller ran, were worn away by the said flanges.

In the annexed drawings, A represents a ring or pulley, grooved on its periphery for the rope, as usual, and having a central bore to receive a series of friction-rollers, $a\ a$. These rollers each revolve on pins $a^1$, the extremities of which are secured in the holes $a^2\ a^2$ in the rings B B situated on each side of the sheave. These rings B B are constructed as shown in Fig. 4, and, as they are larger in diameter than the bore of the grooved ring A, it will be seen that they obviate the necessity of having a groove in the bore to keep the rollers in place. C is a spool or bushing passing centrally through the sheave, provided with a central hole for the reception of the pin on which the sheave revolves, and also with flanges $c\ c$, which, acting against the rollers, prevent the withdrawal of the spool. It will be thus perceived that, instead of the rollers $a\ a$ running directly on the sheave-pin, they run on the bush or spool C, saving the pin from all wear and allowing a smaller pin and a greater number of large rollers to be used, which is a great desideratum, as, where the sheave-pin passes through iron-bound blocks, by increasing its diameter the strap is more cut away and proportionately weakened, and, by diminishing the size of the pin without using the bushing C, a sufficient number of large-diameter rollers cannot be used.

The ring B, being placed outside of the sheave, can be increased in diameter without regard to the bore of the ring A, which could not be accomplished in the old arrangement, where it was in the same plane with the sides of the sheave.

I claim—

The improved sheave herein described, constructed with the perforated plates B B, pivot-pins $a^1$, rollers $a$, flanged sleeve C, and sheave-block A, said pins respectively passing through the rollers, and rigidly attached to one plate only, and said rollers being held and operated between the flanges of said sleeve or collar, as shown and described.

PATRICK KAVANAGH.

Witnesses:
C. A. DURGIN,
E. H. JOHNSON.